United States Patent [19]

White, Jr.

[11] Patent Number: 4,854,914
[45] Date of Patent: Aug. 8, 1989

[54] TURKEY CALLER

[76] Inventor: William T. White, Jr., Rte. 3 - Box 393, Abbeville, Ala. 36310

[21] Appl. No.: 107,543
[22] Filed: Oct. 13, 1987
[51] Int. Cl.$^4$ .............................................. A63H 5/00
[52] U.S. Cl. ................................... 446/402; 446/397
[58] Field of Search ............... 446/397, 402, 404, 418; 84/402, 404, 410, 422.4; 43/1, 2

[56] References Cited

U.S. PATENT DOCUMENTS

| 1,034,307 | 7/1912 | Saunders | 43/2 X |
| 1,449,756 | 3/1923 | Jackson | 446/397 |
| 2,025,181 | 12/1935 | Simon | 446/397 |
| 2,958,157 | 11/1960 | Tannehill | 446/397 |
| 3,208,184 | 9/1965 | Wisor | 446/397 |
| 3,893,364 | 7/1975 | Harrison | 84/422.4 |
| 4,003,159 | 1/1977 | Piper | 446/397 |
| 4,041,639 | 8/1977 | Funk | 446/397 |
| 4,246,826 | 1/1981 | Warrick et al. | 84/422.4 |
| 4,343,108 | 8/1982 | Lee | 446/397 |
| 4,586,912 | 5/1986 | Adams | 446/397 |
| 4,648,852 | 3/1987 | Wingate | 446/397 |
| 4,662,858 | 5/1987 | Hall | 446/397 |

FOREIGN PATENT DOCUMENTS 107177 1/1917 United Kingdom ............... 84/422.4

Primary Examiner—Richard J. Johnson
Assistant Examiner—Sam Rimell
Attorney, Agent, or Firm—Jack N. McCarthy

[57] ABSTRACT

A turkey caller for reproducing the sound of a hen turkey, the caller includes a body device and striker member. The body device has a dish-shaped base member with a cover member biased thereto forming a sound chamber. A striker plate is fixed to the cover member to vibrate it with a long, one-piece wood striker. A wedge member can be placed between the base member and cover member to alter the sound reproduced. The striker has a pen-like holding section, an enlarged node and a cylindrical extending section for providing a balanced placement and sizing for achieving a desired turkey sound.

26 Claims, 4 Drawing Sheets ical Field

This invention relates to a device for imitating the sound made by a hen turkey.

2. Background Art

Many different devices have been used for imitating the sound of wild game, including turkeys, and are well known in the art. While many devices include a striker plate and striker, the mounting of the plate and construction of the striker do not anticipate those of applicant's device. Patents to some such devices are listed below: U.S. Pat. Nos. 2,025,181; 2,958,157; 3,208,184; 4,003,159; 4,041,639; 4,310,986; 4,343,108; 4,586,912; 4,606,733; and 4,648,852.

Disclosure of Invention

One object of the present invention is to provide a device for reproducing the sound of a hen turkey in a consistent manner.

Another object of the present invention is to provide a dish-shaped base member with a separate dish-shaped sounding board cover member placed thereon, said members being held in position by a rubber band placed around the two members, with the projecting part of the dish-shape of the dish-shaped sounding board cover extending into the opening of the dish-shape of the dish-shaped base member forming a sound chamber therebetween, said dish-shaped sounding board cover having a striker plate fixed at the bottom of its dish shape.

A further object of the present invention is to provide a base member and a sounding board cover member with mating continuous flanges located around them, said flanges being only biased towards each other and not immovably fixed together.

Another object of the present invention is to form a turkey caller body having a base member and a sounding board cover member with a trough-like sound chamber located therebetween, said base member and sounding board cover being held together to permit loose motion therebetween to allow vibration.

A further object of the present invention is to provide for varying the angular position between a base member and a sounding board member for tuning the sound chamber. Such an adjustment can be made by a movable wedge member placed between one end of a base member and sounding board member, while holding the other ends together.

Another object of the present invention is to provide a turkey caller which will reproduce all of the different sounds of the hen turkey, such as a yelp, cluck, purr, etc., without losing or distorting the intended sound, especially if a loud call is made; calls can also be made whisper-soft.

A further object of the present invention is to provide a versatile turkey caller, one not only capable of reproducing different sounds of the turkey, but also capable of easily varying the tone of any reproduced sound.

Another object of the present invention is to provide a long, one-piece striker, said striker having a striker plate engaging tip, a pen-like holding section, a node and a top section, placed to provide a balanced construction which will produce the desired vibrations in a turkey caller body when the tip is moved along its striker plate.

BEST MODE FOR CARRYING OUT THE INVENTION

Figure 2:
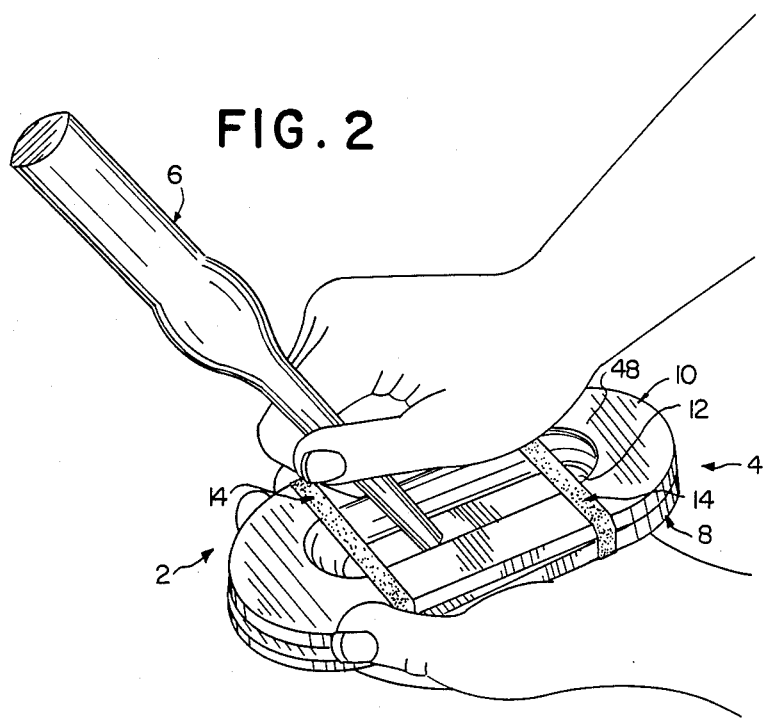
FIG. 2 is a perspective view of the caller body being held in one hand and the striker being held in the other hand, both in an actual holding position for use.

With reference to the drawings, a turkey caller 2 is illustrated which can reproduce the sound of a hen turkey and "call" other turkeys. The turkey caller 2 includes a body 4 and striker 6. Turkey caller body 4 is comprised of five main parts:

(1) a dish-shaped base member 8;
(2) a dish-shaped sounding board cover 10;
(3) a striker plate 12;
(4) an elastic band 14; and
(5) a shim, or wedge, member 16.

The top of the dish-shaped base member 8 has an elongated center dish, or trough opening 18, said trough opening 18 being formed with an elongated flat bottom surface 20 having curved ends. The inner surface of the trough opening 18 tapers outwardly at an angle from the periphery of the elongated flat bottom surface 20 to the top of the dish-shaped base member 8 forming the top periphery 22 of the trough opening 18. An outwardly extending flange 24 extends outwardly a short distance from the top periphery 22 around the trough opening 18 forming a flat upper surface 26 therearound and a peripheral outwardly facing end surface A.

The bottom of the dish-shaped base member 8 has outer sides 28 and ends 34 around said trough opening 18. Outer sides 28 are each curved inwardly and downwardly, with a similar curvature, from the lower edge of the peripheral outwardly facing end surface A of flange 24 to each side of a flat rectangular outer bottom surface 30 and form the entire length of each side of the dish-shaped base member 8. Rectangular outer bottom surface 30 is aligned with the elongated flat bottom surface 20 and spaced therefrom, forming a thin bottom wall 32 therebetween.

Outer ends 34 are each curved inwardly and downwardly, with a curvature similar to the outer sides 28, from the lower edge of the peripheral outwardly facing end surface A of flange 24 to each end of the flat rectangular outer bottom surface 30 and form the entire width of each end of the dish-shaped base member 8. A curved corner edge 36 is formed where each curved outer side 28 meets each curved outer end 34. Thin walls 38 are also formed between the outer sides 28 and the outer ends 34 with the inner tapered surface of the trough opening 18, said thin walls permitting vibration.

The top of the dish-shaped sounding board cover 10 has an elongated center dish, or trough, opening 40, said trough opening 40 being formed having an elongated recess 42 formed at the bottom thereof having curved ends. A striker plate 12, shaped to fit in said elongated recess 42, is fixed in said recess such as by gluing, or any other known method desired. Said striker plate 12 functions as striker plates known in the art, to be vibrated by a striker 6 to produce a desired sound from the sounding board cover 10. The inner surface of the trough opening 40 tapers outwardly at an angle from the periphery of the striker plate 12 to the top of the dish-shaped sounding board cover 10 forming the top periphery 44 of the trough opening 40. An outwardly extending flange 46 extends outwardly from the top periphery 44 of the trough opening 40 having a flat upper surface 48 extending to the upper edge of a peripheral outwardly facing end surface B. Outwardly extending flange 46 is formed having the same outer peripheral edge contour as outwardly extending flange 24 of dish-shaped base member 8.

Figure 8:
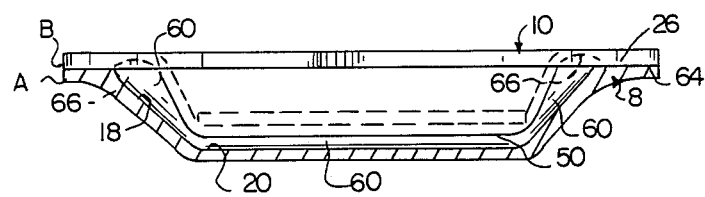
FIG. 8 is a side view of the top dish-shaped sounding board cover member mounted on the bottom dish-shaped base member without a wedge member, with the base member in section.
Figure 9:
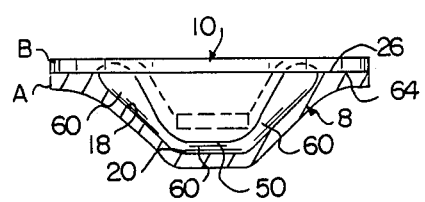
FIG. 9 is an end view of the top dish-shaped sounding board cover member mounted on the bottom dish-shaped base member without a wedge member, with the base member in section.

The bottom of the dish-shaped sounding board cover 10 has a downwardly extending elongated projection 50 into which said elongated center trough opening 40 is formed having thin walled sides 52, ends 54, and bottom 56. The outer peripheral edge contour of flange 46 coincides with the outer peripheral edge contour of flange 24 when said downwardly extending elongated projection 50 of dish-shaped sounding board cover 10 is centered in the elongated center trough opening 18 of dish-shaped base member 8 (see FIGS. 8 and 9). The positioning of the downwardly extending elongated projection 50 in elongated center trough opening 18 forms a contoured trough-like sound chamber 60 having a bottom portion with an upwardly and outwardly extending wall portion. The inner tapered surface of the trough opening 18 and outer surface of the downwardly extending elongated projection 50 forms the wall portion of the contoured trough-like sound chamber 60, and the bottom 20 of the trough opening 18 and outer surface of the downwardly extending elongated projection 50 forms the bottom portion. The wall portion of the contoured trough-like sound chamber 60 extends from a narrow opening adjacent elongated flat bottom surface 20 to a wider opening adjacent the top periphery 22 of the trough opening 18.

The outwardly extending flange 46 has a lower surface 62 extending from said downwardly extending elongated projection 50 to the lower edge of peripheral outwardly facing end surface B. The outer portion of lower surface 62 is formed as a flat lower surface 64 sized to engage flat upper surface 26 of outwardly extending flange 24. The remaining portion of the lower surface 62 is undercut at 66 to provide a thin wall at that point. The undercut portion 66 covers the wider opening of the contoured trough-like sound chamber 60 when the top dish-shaped sounding board cover member 10 is mounted on the bottom dish-shaped base member 8 without a wedge member 16.

Figure 1:
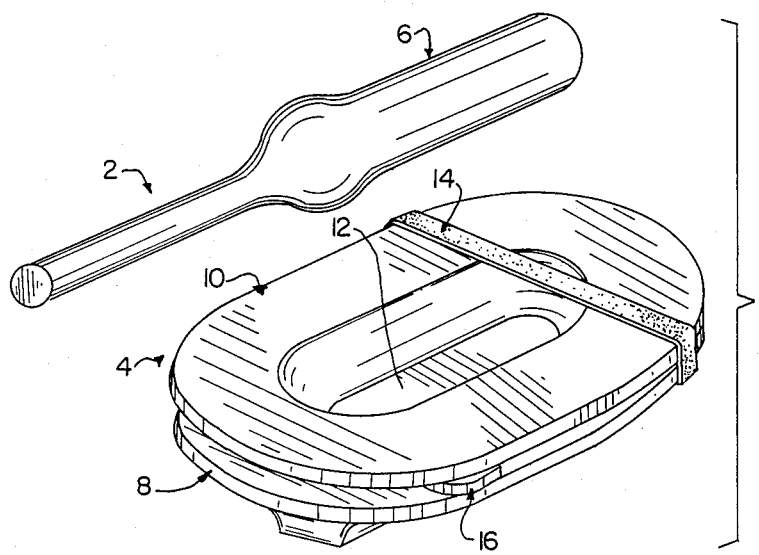
FIG. 1 is a perspective view of the present invention showing the turkey caller body and striker.
Figure 3:
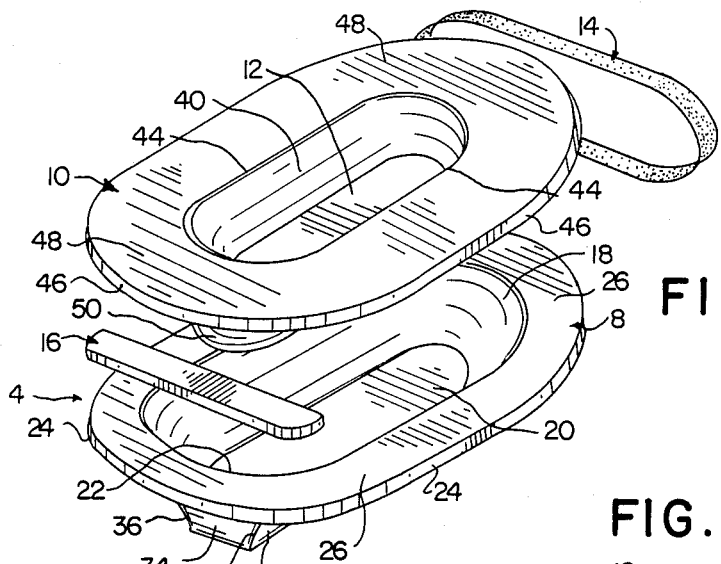
FIG. 3 is an exploded view of the caller body showing the dish-shaped base member, dish-shaped sounding board cover, resilient holding member, and adjustment wedge member.
Figure 4:
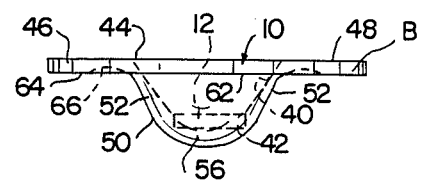
FIG. 4 is an end view of the top dish-shaped sounding board cover member from either end showing the striker plate fixed in place.
Figure 5:
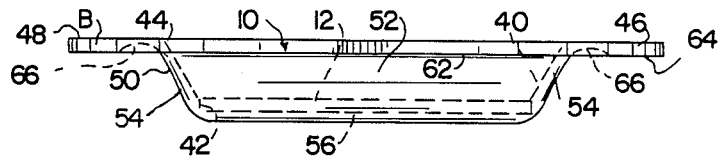
FIG. 5 is a side view of the top dish-shaped sounding board cover member from either side showing the striker plate fixed in place.
Figure 6:
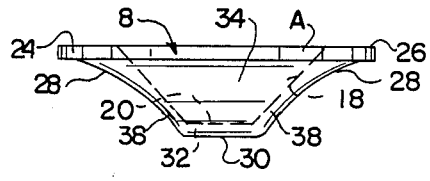
FIG. 6 is an end view of the bottom dish-shaped base member from either end.
Figure 7:
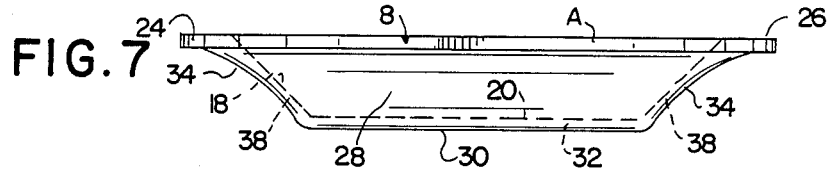
FIG. 7 is a side view of the bottom dish-shaped base member from either side.

The dish-shaped sounding board cover 10 is held with its flat lower surface 64 against the flat upper surface 26 of the dish-shaped base member 8 by an elastic band 14 to permit separate vibration of the cover 10 and member 8. One or more elastic bands 14 can be used to achieve a desired holding force (see FIGS. 1 and 2). To provide a clearance between the flat lower surface 64 and flat upper surface 26, a wedge member 16 is provided for placement therebetween. The wedge member 16 can be moved to adjust the angular positioning of the dish-shaped sounding board cover 10 with respect to the dish-shaped base member 8, opening the upper end of the contoured trough-like sound chamber 60 to the exterior of the caller body 4, providing tuning of the turkey caller 2 by a user, such as a turkey hunter, to obtain a desired call. This angular positioning of said dish-shaped sounding board cover 10 with said dish-shaped base member 8 provides caller body 4 with the capability of easily changing the tone of a call sound. The use of one or more elastic bands 14, or bands of different elasticity, also aids in varying the tone of a call sound of the caller body 4. These variables provide a turkey caller 2 which is very versatile.

The dish-shaped sounding board cover 10 can be made of a soft-textured wood such as white pine, cedar, mahogany, or other porous woods. The dish-shaped base member 8 should also preferably be formed of a soft-textured wood. A dish-shaped base member 8 and dish-shaped sounding board cover 10 were made of mahogany and successfully tested. The striker plate 12 was made of slate. Aluminum is another material used for striker plates. The wedge member 16 was made from mahogany and a rubber band was used to hold the dish-shaped members 8 and 10 together, alone, and with a wedge member 16 inserted between them as described above.

A long, one-piece striker 6 is used to engage the striker plate 12 and vibrate it and in turn, vibrate sounding board cover 10 and base member 8, to make a desired sound, the natural sound of a turkey. It is noted that strikers have been made out of different materials, including wood and plastics. The striker 6 is formed having a tip 100 for engaging the striker plate 12. A cylindrical, pen-like, section 102, to be held by a user, such as a pen is held, extends from said tip 100. An enlarged node 104 is placed at the upper end of the cylindrical pen-like section 102 with a cylindrical section 106 extending from the enlarged node 104, said node 104 and cylindrical section 106 being axially in line with the cylindrical pen-like section 102. Said node 104 and cylindrical extension section 106 providing additional striker material to said cylindrical pen-like section 102 for achieving a desired vibration of striker plate 12. Section 102, node 104, and cylindrical section 106 form a balanced placement and sizing of parts to arrive at an integral striker which will provide desired vibrations when its tip 100 is moved across the striker plate 12. The cylindrical section 106 has a larger diameter and is heavier than the cylindrical pen-like section 102 so that when the striker 6 is placed on a surface, such as the ground, table, etc., the tip 100 will be held off of the surface by the heavier cylindrical section 106 pivoting the striker 6 about the enlarged node 104 and placing the other end of the cylindrical section 106 on the surface. This prevents the tip 100 from becoming contaminated by any substance on the surface, such as water, grease, etc. Said striker 6 can be formed from a piece of wood with said node 104 being formed around a knot in the wood and said cylindrical holding section 102 and said cylindrical extension section 106 being knot-free.

Figure 10:
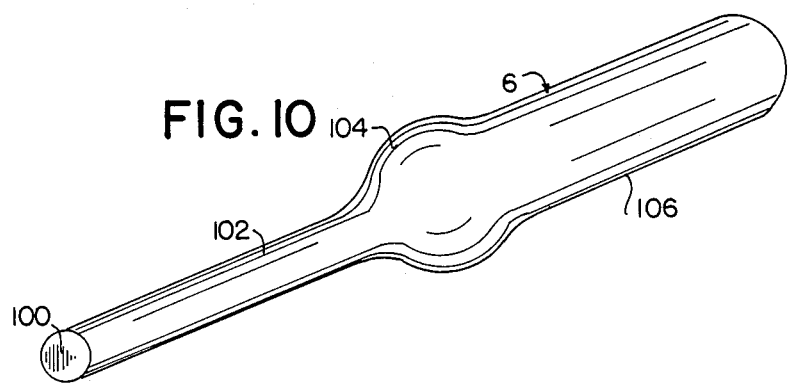
FIG. 10 is a perspective view of the striker alone.
Figure 11:
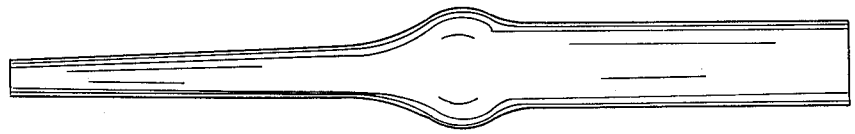
FIG. 11 is a side view of the striker setting forth the dimensions of a constructed striker which produced excellent results.
Figure 12:
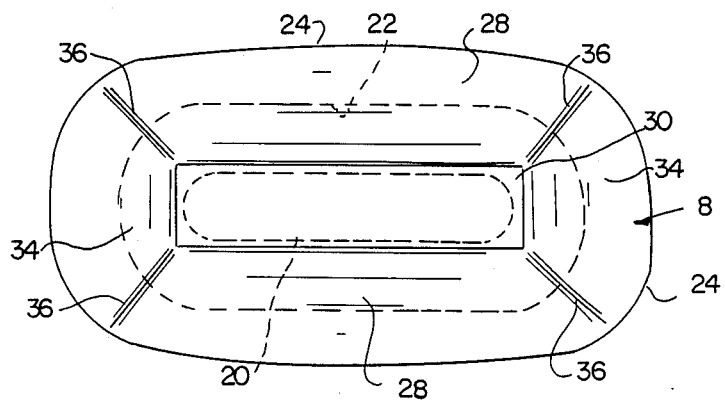
FIG. 12 is a bottom view of the bottom dish-shaped base member showing its concave sides and ends extending upwardly and outwardly from the outer edge of its center flat rectangular surface.
Figure 13:
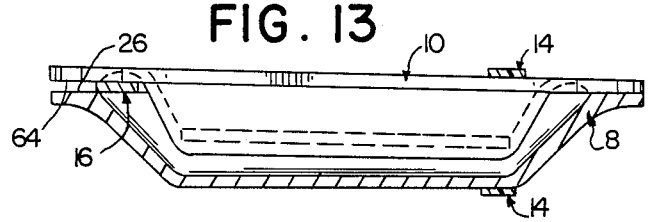
FIG. 13 is a side view, similar to FIG. 8, with a wedge member located at one end of the caller body separating the mating flanges of the bottom dish-shaped base member and top dish-shaped sounding board cover member, with an elastic band located around the opposite end of the caller body.
Figure 14:
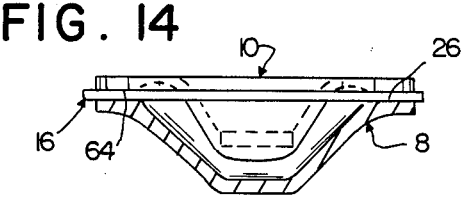
FIG. 14 is an end view, similar to FIG. 9, with a wedge member located at one end of the caller body separating the mating flanges of the bottom dish-shaped base member and top dish-shaped sounding board cover member.

A striker 6, constructed for use with the mahogany dish-shaped base member 8 and dish-shaped sounding board cover 10, mentioned above, was made of southeastern native pine. The pine wood is to be sap-free. This striker 6 was successful in producing the desired sounds. Dimensions of this striker 6, having a balanced placement and sizing for achieving a desired turkey sound, are shown on FIG. 11. The length of the striker 6 and positioning of the section 106 provide for ease of movement of the tip 100 and pen-like section 102 (see FIGS. 2 and 10), and of pressure applied. In the striker 6 constructed, a straight section of wood was found having a knot therein; the striker 6 was formed with the knot as the node 104, leaving the cylindrical pen-like section 102 and cylindrical extension section 106 knot-free.

I claim:

1. A turkey caller including the combination of a base member having a first top surface and a first bottom surface, said first top surface having a dish opening, a separate sounding board cover for said base member having a second bottom surface and a second top surface, said second bottom surface of said sounding board cover being located over said dish opening of said first top surface of said base member and forming a sound chamber therewith, said separate sounding board cover being movable relative to said base member, said sounding board cover having a striker plate means for being vibrated, said striker plate means being fixed to said second top surface, and means for biasing said separate sounding board cover towards said base member.

2. A combination as set forth in claim 1 wherein said second bottom surface of said sounding board cover has a projection extending downwardly, said projection having an outer surface extending into said dish opening.

3. A combination as set forth in claim 2 wherein said second top surface has a dish opening extending into said projection, said striker plate being fixed to the bottom of said dish opening extending into said projection.

4. A combination as set forth in claim 3 wherein means are located between said first top surface of said base member and said second bottom surface of said sounding board cover for providing a clearance therebetween.

5. A combination as set forth in claim 1 wherein said first top surface of said base member has a flat surface around said dish opening, said base member having an outer peripheral edge, said flat surface extending to said outer peripheral edge, said sounding board cover having a matching outer peripheral edge for cooperating with said outer peripheral edge of said base member, said second bottom surface having a flat surface formed thereon extending inwardly from said outer peripheral edge of said sounding board cover to match the flat surface of said top surface of said base member around said dish opening for cooperating with it.

6. A combination as set forth in claim 5 wherein said second bottom surface of said sounding board cover has a projection with an outer surface extending downwardly, said projection extending downwardly into said dish opening of said base member, said sounding board cover having a dish opening extending into said projection, said striker plate means being fixed to the bottom of said dish opening of said sounding board cover.

7. A combination as set forth in claim 6 wherein said outer surface of said projection is spaced from said dish opening of said base member, said dish opening of said base member being spaced further from said outer surface of said projection at the top of said dish opening of said base member than adjacent the bottom of said dish opening of said base member.

8. A combination as set forth in claim 1 wherein said means for biasing said separate sounding board cover towards said base member is at least one rubber band around said sounding board cover and said base member.

9. A combination as set forth in claim 1 wherein said base member and said sounding board cover are made of naturally porous wood.

10. A combination as set forth in claim 1 including means for vibrating said striker plate means and thereby said separate sounding board cover.

11. A combination as set forth in claim 10 wherein said striker is made of wood.

12. A combination as set forth in claim 11 wherein the wood is southeastern native pine.

13. A combination as set forth in claim 10 wherein said means for vibrating said striker plate means is a long, one-piece striker, said striker having a striker plate means engaging tip, a cylindrical holding section, and a node and second cylindrical section axially in line with said holding section.

14. A combination as set forth in claim 1 wherein said dish opening has a top periphery, a bottom surface having a periphery, and an inner surface extending from the periphery of the bottom surface to the top periphery.

15. A combination as set forth in claim 14 wherein means are located between said first top surface of said base member and said second bottom surface of said sounding board cover for providing a clearance therebetween.

16. A combination as set forth in claim 14 wherein said first top surface of said base member has a flat surface around said dish opening extending outwardly from said top periphery of said dish opening, said base member having an outer peripheral edge, said flat surface extending to said outer peripheral edge, said sounding board cover having an outer peripheral edge, said second bottom surface having a flat surface extending inwardly from said outer peripheral edge of said sounding board cover over the flat surface of said top surface of said base member around said dish opening for cooperating with it.

17. A combination as set forth in claim 16 wherein said flat surface of said second bottom surface is biased towards said flat surface around said dish opening, means are located between said flat surface of said second bottom surface and said flat surface around said dish opening for providing a clearance therebetween, said means for biasing said sounding board cover towards said base member including one or more elastic bands.

18. A combination as set forth in claim 17 wherein said means for biasing includes two elastic bands, one at each end of said sounding board cover and base member.

19. A combination as set forth in claim 16 wherein said second bottom surface of said sounding board cover has a projecting surface extending downwardly, said projecting surface extending into said dish opening forming a dish-like sound chamber with said bottom and inner surface of said dish opening, said second bottom surface having an undercut surface between its projecting surface and flat surface.

20. A turkey caller including the combination of a base member having a first top surface and a first bottom surface, said first top surface having a dish opening, a separate sounding board cover for said base member having a second bottom surface and a second top surface, said second bottom surface of said sounding board cover being located over said dish opening of said first top surface of said base member and forming a sound chamber therewith, said sounding board cover having a striker plate means for being vibrated, said striker plate means being fixed to said second top surface, means for biasing said separate sounding board cover towards said base member, said first top surface of said base member having a flat surface around said dish opening, said base member having an outer peripheral edge, said flat surface extending to said outer peripheral edge, said sounding board cover having a matching outer peripheral edge for cooperating with said outer peripheral edge of said base member, said second bottom surface having a flat surface formed thereon extending inwardly from said outer peripheral edge of said sounding board cover to match the flat surface of said top surface of said base member around said dish opening for cooperating with it, shim means are placed between said flat surface of said base member and flat surface of said sounding board cover to separate them for tuning said sound chamber.

21. A combination as set forth in claim 20 wherein said means for biasing said separate sounding board cover towards said base member is at least one rubber band around said sounding board cover and said base member.

22. A turkey caller including the combination of a base member having a first top surface and a first bottom surface, said first top surface having a dish opening, a separate sounding board cover for said base member having a second bottom surface and a second top surface, said second bottom surface of said sounding board cover being located over said dish opening of said first top surface of said base member and forming a sound chamber therewith, said sounding board cover having a striker plate means for being vibrated, said striker plate means being fixed to said second top surface, means for biasing said separate sounding board cover towards said base member, shim means are placed between said first top surface and said second bottom surface to tune said sound chamber.

23. A turkey caller including the combination of a base member having a first top surface and a first bottom surface, said first top surface having a dish opening, a separate sounding board cover for said base member having a second bottom surface and a second top surface, said second bottom surface of said sounding board cover being located over said dish opening of said first top surface of said base member and forming a sound chamber therewith, said sounding board cover having a striker plate means for being vibrated, said striker plate means being fixed to said second top surface, means for biasing said separate sounding board cover towards said base member, said dish opening having a top periphery, a bottom surface having a periphery, an inner surface extending from the periphery of the bottom surface to the top periphery, said inner surface of the dish opening tapers outwardly at an angle from the periphery of the bottom surface to the top periphery.

24. A turkey caller including a combination of a base member having a first top surface and a first bottom surface, said first top surface having a dish opening, a separate sounding board cover for said base member having a second bottom surface and a second top surface, said second bottom surface of said sounding board cover being located over said dish opening of said first top surface of said base member, said second bottom surface of said sounding board cover having a projection extending downwardly, said projection extending into said dish opening in said first top surface of said base member forming a dish-like sound chamber, said second top surface having a dish opening extending into said projection, a striker plate being fixed to the bottom of said dish opening extending into said projection, means located between said first top surface of said base member and said second bottom surface of said sounding board cover for providing a clearance therebetween, said separate sounding board cover being movable relative to said base member, and means for biasing said separate sounding board cover towards said base member.

25. A combination as set forth in claim 24 wherein said clearance opens said dish-like sound chamber to the exterior of said caller for obtaining tuning.

26. A combination as set forth in claim 24 wherein said means for biasing includes one or more elastic bands.

* * * * *